3,297,571
LUBRICANT COMPOSITION AND ARTICLES AND PROCESS OF PREPARING AND USING THE SAME
Laszlo J. Bonis, Brookline, Mass., assignor to Ilikon Corporation, Natick, Mass., a corporation of Delaware
No Drawing. Filed Sept. 14, 1962, Ser. No. 223,821
1 Claim. (Cl. 252—12)

The present invention concerns improved lubricant compositions, articles of manufacture made therefrom, and the process of preparing and employing these compositions and articles. In particular, the invention relates to self-lubricating solid and powdered compositions containing a superior dry lubricant. Even more particularly the instant discovery relates to the process of lubricating friction contacting surfaces with a novel dry lubricant which has enhanced resistance to oxidation at elevated temperatures. Still more particularly the instant invention concerns dry lubricant impregnated sintered metal matrices and articles such as bearings prepared therefrom.

The reduction of friction by placing lubricating materials between two or more pressure-resisting frictional contacting surfaces is generally accomplished by either wet lubricants such as oils, greases and fatty substances or by dry lubricants such as powdered metal disulfides such as molybdenum and tungsten disulfides. The dry lubricants are particularly and widely used for lubrication in areas where wet lubricants cannot be tolerated such as lubrication under subatmospheric and elevated conditions such as exist in vacuums or in space travel applications, in the presence of corrosive media, and in underwater bearing applications. Existing methods of employing dry lubricants generally comprise placing the dry lubricant on the surface of the contacting materials in the form of a thin lubricating film. The lubricant thereby functioning as a separator between the two contacting surfaces as they move relative to each other. These thin separatory dry lubricant films are eventually worn away by the movement of the frictional members relative to one another, thereby requiring prompt replacement to avoid damage to the contacting surfaces. Additionally many of these dry lubricants oxidize at a progressively rapid rate as the temperature of the operational environment increases. For example, molybdenum disulfide completely oxidizes above about 750° F., while tungsten disulfide is completely oxidized at about above 850° F. Further metal sulfides often do not have a favorable corrosion resistance, and possess disagreeable properties such as odor and color. Also these metal sulfides are unable to function properly in a fluorine environment since they usually react with the fluorine such as the liquid fluorine or fluorine-containing compounds which are used in gyroscopes and with other instruments requiring dry lubricants.

It is therefore an object of this invention to provide a novel dry lubricant which resists oxidation at elevated temperature, has a low rate of corrosion resistance, has superior physical characteristics, is economically and commercially available and which lubricant may be employed in a fluorine environment. It is a further object of this invention to provide unique self-lubricating solid articles of manufacturing such as bearings having frictional contacting surfaces which articles possess superior anti-friction properties such as under conditions of elevated temperature and sub-atmospheric pressure environments. It is also an object of this invention to provide dry lubricant powdered compositions and solid articles of manufacturing, wherein the dry lubricant is obtained as required from reservoirs dispersed in the article by virtue of frictional wearing forces on the article. An additional object of this invention is to provide a process of lubrication employing a dry lubricant which promotes the formation of a stable high temperature dry lubricant film and thereby reduces friction on contacting frictional surfaces. Another object of this invention is to provide powdered metal articles which are self-lubricating. Also an object of this invention is to provide a unique method of sintering powdered compositions which minimizes temperature degradation of temperature sensitive dry lubricants. Other objects and advantages of the foregoing invention will be apparent to those skilled in the art from the foregoing detailed disclosures and discussion.

It has now been discovered that calcium fluoride is a superior dry lubricant between frictional and load bearing contacting surfaces particularly where one or more of the surfaces are moving relative to the other. In particular, calcium fluoride and calcium fluoride-containing compositions provide excellent dry lubrication to solid or metal contacting surfaces at elevated temperatures above the 1000° F., such as from 1000° F. to 2200° F. without perceptible oxidation of the calcium difluoride. Further calcium difluoride being itself a fluorine-containing compound can be employed as a lubricant in a fluorine environment such as in contact with liquid fluorine in gyroscopes for a prolonged period of time without adverse reaction between the calcium fluoride and the fluorine. It has been found that the employment of a thin film of solid or particularly relatively small discrete particles of powdered calcium difluoride between contacting surfaces considerably reduces the frictional forces between these surfaces, while at extremely elevated temperatures the calcium difluoride is less corrosive than those conventional metal sulfide lubricants. Calcium difluoride being a white stable commercially available economical material known as fluospar of either the pure or synthetic type has utility in a wide variety of wet and dry lubricant applications, but has particular utility in those environments subject to high temperature and sub-atmospheric conditions such as those existing in interplanetary travel and space environment.

In the process of lubrication the calcium difluoride can be ground in powdered form and dispersed in suitable liquid or dry vehicles and applied to as a thin powder or liquid film on or between one or more of the contacting frictional surfaces to be protected. Suitable methods for applying calcium difluoride include but are not limited to: dusting the surface of the material to be protected with dry powdered calcium fluoride either alone or in combination with inert carrier materials or other dry lubricants such as metal sulfides or soft metal powders; dispersing the powdered calcium fluoride in a suitable fluid vehicle such as a heavy hydrocarbon oil or hydrocarbon grease or another dry lubricant and coating it on the surface to be protected; and forming a suspension of the dry powdered calcium difluoride in a suitable organic binder such as a varnish and painting it on the surface to be protected.

In one preferred embodiment of the instant invention powdered calcium difluoride is thoroughly admixed with a material preferably a powder material capable of being fabricated into a solid pressure resistant article having an exposed surface subject to frictional forces. In this manner there are provided articles containing relatively small powdered solid phase particles of calcium fluoride dispersed throughout or in a particular portion of a solid matrix which matrix has a wearing surface subject to frictional forces usually by contact with a solid moving member of the same or a different composition. The material forming the matrix of the article in which the calcium fluoride dry lubricant is dispersed can be any liquid, solid, or viscous material capable of being formed into a solid pressure-resistant coherent matrix. Suitable material thus includes those compounds and elements capable of being formed, such as by pouring into a mold or compacting in die, and heated such as to effect curing or a cross-linking reaction or subject to elevated temperatures with or without high pressure to form a sintered material. Matrix material may then comprise organic polymeric compounds like thermosetting resins such as hydroxyl aromatic-aldehyde resins like phenol-formaldehyde, resorcinol-formaldehyde, phenol-furfural; amide-aldehyde resins like urea-formaldehyde; curable natural and synthetic elastomers like butyl rubber, halogenated butyl rubber, polydienes, diene-acrylonitrile copolymers, natural rubber, vinyl polymers like polystyrene, styrene-butadiene copolymers; polyamides like nylon; polycarbonates; polyesters, polyethers, etc. Matrix material may also comprise inorganic materials such as: clays, silicates, metal oxides, carbonates, silica, alumina, glass, iron oxide, coke, and other such vitreous materials capable of being fused or compacted into solid coherent unitary masses.

In one embodiment of the invention the matrix material comprises powdered metals, metal alloys and metal-containing compounds capable of being compacted and sintered to form a solid metal-containing matrix such as by conventional powder metallurgical methods. The metals employed include those relatively soft metals like zinc, copper, and tin to the hardest steel tool metals and metal alloys. The powdered metals employed can thus include those metals and metal alloys containing trace or minor quantities of property modifying metal constituents such as copper, tin, zinc, lead, iron, chromium, cadmium, magnesium, palladium, platinum, rhodium, vanadium, nickel, cobalt, tungsten, molybdenum, aluminum, manganese, etc., and combinations thereof either with or without other dry lubricants such as metal sulfides, boron nitride, graphite and the like.

The calcium fluoride powder can be thoroughly admixed with the metal or metal alloy powder by hand or more efficiently by high-speed powder blending machines. Good results are commonly obtained by having the metal powder particles of larger average diameter than the calcium fluoride powder with which it is admixed. The quantity of the calcium difluoride to be admixed with the metal powder depends on the amount and degree of lubrication desired and the particular conditions under which the article is to be employed. Commonly the amount of calcium fluoride employed will vary from about 3 weight percent to about 35 weight percent such as between 5 to 25 weight percent of the matrix. Generally in self-lubricating metal alloy compositions the tensile strength elongation, and compressive strength increase with decreasing amounts of calcium fluoride, while as the amount of calcium fluoride increases the coefficient of thermal expansion and electrical resistivity increases and the hardness decreases.

After admixture with the calcium fluoride the powdered composite metal mixture can be employed as a dry powdered lubricating mixture. For example, where the powdered mixture contains a ferric oxide or a metal such as nickel, cobalt or iron exhibiting electromagnetic characteristics when placed in an electrical field, that is a metal which demonstrates magnetic properties when placed in a magnetic field, the mixtures can then be employed in the dry powder form either alone or with carbon black or coloring pigments or heat hardening resins in electrical printing processes. Thus a nickel, cobalt or iron-containing mixture with calcium difluorides will find particular utility as a combination dry lubricant and printing powder in the electro- and xero-graphic processes where the metal powder is cascaded over a plate containing a static charge with the black or colored metal powder adhering to particular electrical charge areas on the plate. In this manner the dry powder serves to lubricate the rotating or cascading brush passing over the plate containing the electrical charge and also provides the receptive material to form the printed image.

The dry metal powder mixture either with or without additional binder material or other conventional additives can be compacted under high pressures such as in the vicinity of from 2000 to 50,000 pounds per square inch or higher in a suitable die or mold or powdered metal receiving means to form a compacted metal powdered article of predetermined form and structure. This article is then sintered at elevated temperature such as from about 1600 to 2300° F., and optionally heat aged and slowly or rapidly quenched in a fluid such as air, oil, water to enhance the hardening characteristics of the compacted and sintered article. Of course the sintering and compacting steps can be combined in a single step wherein both high pressures and elevated temperatures are applied to the material in a confining mold. The time, temperature, and pressures required depend on the ultimate physical properties of the articles desired. Commonly the time of sintering is proportional to the temperature employed and ranges from 10 to 120 minutes with decreasing temperatures. An advantage of the calcium fluoride dry lubricant is that the sintering process can be carried out at elevated temperatures in an oxidizing atmosphere without special precautions, due to the negligible oxidation rate of the calcium difluoride below 2200° F. However, it is desired where the sintering temperature might exceed 2300° F. and thus induce some oxidation of the calcium fluoride, that the compacting and sintering process be carried out in an inert atmosphere or a non-oxidizable atmosphere such as in the presence of hydrogen or nitrogen or other inert gases. Further non-oxidizing conditions may also be employed at lower temperatures where the dry powder mixture contains other more oxidizable materials. Where a more porous article is desired it will be profitable to admix with the calcium fluoride-powdered metal mixture a dry volatile material that can be selectively volatilized during the sintering process so that the sintered article will have a more porous structure.

In a further embodiment of the invention composite powdered material such as powdered metals containing conventional temperature sensitive dry lubricants like the metal sulfides, boron nitride, etc., may be sintered into solid articles such as bearings by employing pulsating induction heat to the compacted articles. The use of a high frequency induction heating coil or means for relatively short time period cycles such as 1 to 10 seconds, permits those dry lubricants normally oxidizable at the sintering temperatures used in powdered metallurgy to be incorporated into sintered articles without any or excessive decomposition. In this feature the powdered metal is commonly compacted and sintered in one step. In this manner also calcium fluoride can be rapidly sintered into articles at elevated temperatures above 2300° F. without excessive oxidation.

The mixtures described can be formed into a variety of improved antifriction articles such as porous powdered metal articles, having load bearing moving or non-moving frictional surfaces where one or more of the surfaces or articles contain reservoirs of the calcium fluoride. The articles formed from the dry powdered mixtures can be of any predetermined shape, size or characteristics and include brushes for electrical generators, contacting switches, gears, dashpots, valve stems, tubular elongated bearing sleeves, journal and thrust bearings, solid and tubular shafts, races, retainers, bushings, etc., or other articles subject to frictional forces and having wearable destructible friction surfaces. In the articles so formed the calcium difluoride dry lubricant may be evenly dispersed throughout the article such as uniformly throughout the metal matrix. Where desired the lubricant may be incorporated only into particular areas of the article such as the surface areas or other areas of the article subject to particular severe frictional forces.

The superior friction type powdered metal articles prepared by the compositions of and the processes of this invention have the calcium difluoride relatively evenly dispersed throughout the matrix of the article thereby providing continuous lubrication from what are essentially pores or tiny reservoirs of the solid dispersed dry lubricant in the matrix of the article. These reservoirs of calcium fluoride also exist in the surface of the article, and therefore, when two surfaces move relative to one another and one or more of these surfaces contains the calcium difluoride reservoirs, these reservoirs, during the frictional movement between the surfaces are ruptured and continuously and progressively exposed to provide and to form a thin lubricating calcium difluoride film on the frictional surface. However, contrary to the conventional method, when this lubricating film is worn out a new supply of calcium difluoride material in the metal itself which is self-adjusting, depending on the frictional or wearing force against this friction surface, is formed. Therefore, if one particular area of the contacting or friction surfaces becomes bare of calcium difluoride dry lubricants, the reservoirs of calcium difluoride in that area immediately due to the wearing of the surface in that area, re-form the lubricating film between the surfaces and therefore re-establishes the correct lubricating conditions. In those particular articles subject to constant wear, such as thrust bearings, the articles so formed avoid the necessity for constant external lubrication due to the fact that these reservoirs are in the material and are continually being exposed to re-form or form the correct predetermined anti-frictional lubricating film as the material is subject to wear by frictional contact. In the manner described there is therefore provided self-lubricating, self-adjusting articles containing therein a superior dry lubricant of calcium difluoride dispersed in a metal or resin or other solid matrix which is effective under sub-atmospheric conditions, and which lubricant resists oxidation at elevated temperatures.

The invention will be more fully understood from the following detailed example:

Example 1. Commercially available calcium difluoride was ground into a powder of less than 400 mesh. The powdered calcium difluoride was thoroughly admixed with an INCO "B" nickel alloy powder of −325 mesh both by hand and by a Waring Blendor in the following compositions: A, B, C.

(A) 10% calcium difluoride and 90% nickel powder.
(B) 20% calcium difluoride and 80% nickel powder.
(C) 25% calcium difluoride and 75% nickel powder.

The resulting mixtures were then loaded into a cylindrically-shaped graphite die having an upper and lower graphite plug, the upper end being capped with a graphite plunger. The cylinders were then placed into a cylindrical electrical resistance surface which were mounted on the stand of a hydraulic jack. The mixtures in the die were subject to applied pressures of from 2000 p.s.i. to 15,000 p.s.i. at temperatures of between 1700° F., and 1400° F. In each case the pressure was maintained as the temperature rose and was held at a pressure and temperature designated for about one-half hour. The compacted sintered cylindrical calcium difluoride-containing nickel rods capable of being used as moving or rotating shafts were then removed from the die and visually and microscopically examined. All the compacted rods obtained were readily machinable and were well sintered. The best compacts were those obtained at the higher temperatures and pressures with the lower quality compacts obtained at the lower pressures and temperatures.

The sintered rods attained by the described process contain reservoirs of calcium fluoride dispersed throughout the rod thereby providing an internal lubricating source. By employing a suitable die and similar techniques, bearings and other load bearing powdered metal articles can be prepared. These articles will find special utility in ultra high vacuum conditions or at elevated temperatures where conventional dry lubricants would be subject to oxidation and significant weight loss.

It will be understood that various modifications in the described invention may be effected by those skilled in the art without departing from the spirit and scope of the invention.

What is claimed is:

A solid coherent metal material which is self-lubricating in an oxidizing atmosphere at temperatures in excess of 1000° F., said material being a hot-pressed and sintered admixture of a major amount of powdered nickel alloy having a particle size of 325 mesh or less and a quantity of particulate calcium fluoride, the average particle size of said calcium fluoride being 400 mesh or less, said calcium fluoride accounting for between 3 and 35 weight percent of the total admixture.

References Cited by the Examiner

UNITED STATES PATENTS

| | | | |
|---|---|---|---|
| 2,214,104 | 9/1940 | Hildabolt et al. | 252—12 |
| 2,235,835 | 3/1941 | Goetzel | 75—200 |
| 2,400,091 | 5/1946 | Alfthan | 252—12.2 X |
| 2,445,003 | 7/1948 | Ramadanoff | 252—12 |
| 2,446,251 | 8/1948 | Stricklin | 252—25 |
| 2,612,443 | 9/1952 | Goetzel et al. | 75—200 |
| 3,051,659 | 8/1962 | Troelstra | 252—25 X |

FOREIGN PATENTS

| | | |
|---|---|---|
| 673,836 | 6/1952 | Great Britain. |
| 747,533 | 4/1956 | Great Britain. |

DANIEL E. WYMAN, *Primary Examiner.*

ALPHONSO D. SULLIVAN, *Examiner.*

R. E. HUTZ, P. P. GARVIN, *Assistant Examiners.*